(12) United States Patent
Lombaert et al.

(10) Patent No.: US 10,286,587 B2
(45) Date of Patent: May 14, 2019

(54) PROCESS FOR MANUFACTURING PANELS FOR FLOOR AND WALL COVERINGS

(71) Applicant: BerryAlloc NV, Menen (BE)

(72) Inventors: Pol Lombaert, Menen (BE); Matthias Wyseur, Menen (BE); Tim Vanderhaegen, Menen (BE)

(73) Assignee: BerryAlloc NV, Menen (BE)

( * ) Notice: Subject to any disclaimer, the term of this patent is extended or adjusted under 35 U.S.C. 154(b) by 258 days.

(21) Appl. No.: 15/309,583

(22) PCT Filed: May 13, 2015

(86) PCT No.: PCT/IB2015/053519
§ 371 (c)(1),
(2) Date: Nov. 8, 2016

(87) PCT Pub. No.: WO2015/173743
PCT Pub. Date: Nov. 19, 2015

(65) Prior Publication Data
US 2017/0144354 A1    May 25, 2017

(30) Foreign Application Priority Data
May 13, 2014   (BE) .................................. 2014/0354

(51) Int. Cl.
*B29C 47/00* (2006.01)
*B32B 27/30* (2006.01)
(Continued)

(52) U.S. Cl.
CPC ........ *B29C 47/0064* (2013.01); *B29C 47/025* (2013.01); *B29C 47/0893* (2013.01);
(Continued)

(58) Field of Classification Search
CPC ............ B29C 47/0064; B29C 47/0025; B29C 47/0893; B29C 47/0019; B29C 47/065;
(Continued)

(56) References Cited

U.S. PATENT DOCUMENTS 8,519,053 B2    8/2013   Tian
8,592,501 B2    11/2013  Phan
(Continued)

FOREIGN PATENT DOCUMENTS

JP    2001293770 A    10/2001
WO    2016001775 A1   1/2016

*Primary Examiner* — Michael Bernshteyn
(74) *Attorney, Agent, or Firm* — James Creighton Wray; Meera P. Narasimhan (57) ABSTRACT

The present invention relates to a process for the production of panels for floor or wall coverings comprising the steps of mixing and homogenizing raw materials, thereby obtaining a dryblend, extruding said dryblend, thereby obtaining one or more thermoplastic layers, laminating the aforementioned thermoplastic layers, thereby obtaining a panel for floor or wall coverings, wherein said raw materials and/or said dryblend are predominantly transported vertically downwards during the weighing, mixing and/or homogenizing of said raw materials and during the feeding of said dryblend to extruders via feeding units.

13 Claims, 3 Drawing Sheets (51) Int. Cl.

| | | |
|---|---|---|
| *B32B 27/08* | (2006.01) | |
| *B32B 27/12* | (2006.01) | |
| *B32B 27/20* | (2006.01) | |
| *B32B 27/22* | (2006.01) | |
| *E04F 15/10* | (2006.01) | |
| *E04F 13/18* | (2006.01) | |
| *B29C 47/02* | (2006.01) | |
| *B32B 27/06* | (2006.01) | |
| *B29C 47/08* | (2006.01) | |
| B29C 47/06 | (2006.01) | |
| B29C 47/10 | (2006.01) | |
| B29C 47/14 | (2006.01) | |
| B29C 47/36 | (2006.01) | |
| B29K 27/06 | (2006.01) | |
| B29K 105/26 | (2006.01) | |
| B29L 7/00 | (2006.01) | |
| E04F 15/02 | (2006.01) | |

(52) U.S. Cl.
CPC ............ *B32B 27/065* (2013.01); *B32B 27/08* (2013.01); *B32B 27/12* (2013.01); *B32B 27/20* (2013.01); *B32B 27/22* (2013.01); *B32B 27/304* (2013.01); *E04F 13/18* (2013.01); *E04F 15/105* (2013.01); *E04F 15/107* (2013.01); *B29C 47/0019* (2013.01); *B29C 47/065* (2013.01); *B29C 47/1027* (2013.01); *B29C 47/1045* (2013.01); *B29C 47/145* (2013.01); *B29C 47/365* (2013.01); *B29C 2947/92209* (2013.01); *B29C 2947/92333* (2013.01); *B29C 2947/92704* (2013.01); *B29C 2947/92828* (2013.01); *B29K 2027/06* (2013.01); *B29K 2105/26* (2013.01); *B29L 2007/002* (2013.01); *B32B 2260/021* (2013.01); *B32B 2260/046* (2013.01); *B32B 2262/101* (2013.01); *B32B 2266/0264* (2013.01); *B32B 2266/06* (2013.01); *B32B 2307/304* (2013.01); *B32B 2307/40* (2013.01); *B32B 2307/546* (2013.01); *B32B 2307/554* (2013.01); *B32B 2419/04* (2013.01); *B32B 2607/00* (2013.01); *B32B 2607/02* (2013.01); *E04F 15/02038* (2013.01)

(58) Field of Classification Search
CPC ............ B29C 47/1027; B29C 47/1045; B29C 47/145; B32B 27/304; B32B 27/065; B32B 27/08; B32B 27/12; B32B 27/20; B32B 27/22; E04F 15/105; E04F 15/107; E04F 13/18
USPC ......................................................... 428/522
See application file for complete search history.

(56) References Cited

U.S. PATENT DOCUMENTS

2005/0003221 A1\* 1/2005 Walrath ............. B29C 47/0019
428/522
2010/0159213 A1\* 6/2010 Przybylinski ........... B32B 27/04
428/195.1

\* cited by examiner

PROCESS FOR MANUFACTURING PANELS FOR FLOOR AND WALL COVERINGS

This application claims the benefit of Belgian Application No. BE2014/03054 filed May 13, 2014, and PCT/IB2015/053519 filed May 13, 2015, International Publication No. WO 2015/173743 A1, which are hereby incorporated by reference in their entirety as if fully set forth herein.

TECHNICAL FIELD

The present invention relates to a process for manufacturing panels for floor or wall coverings. In particular, the invention relates to a manner for producing a dryblend for extruding one or more thermoplastic layers of a laminate tile.

BACKGROUND

Producing a dry thermoplastic mixture, also called "dryblend", is of primary importance for the quality of panels obtained by forming of thermoplastic sheets and laminating of the obtained sheets to laminate panels. Such panels are desirable for wall and floor coverings in both domestic and industrial environment. Important properties of said panels are, inter alia, dimensional stability, flexural stiffness, resistance to curling and water resistance. Depending on the specific application of the panels, however, the properties need to be optimized. This optimization can be done by optimizing the method for producing the afore-mentioned dryblend and/or adjusting the composition of such dryblend.

In this regard, U.S. Pat. No. 8,519,053 describes products for floor coverings comprising at least one layer of a polymeric binder, wherein said binder comprises homopolymer PVC resin and thermoplastic, high-molecular polyester resin or highly viscous polyester resin. The polyester resin comprises renewable raw materials and can be amorphous or crystalline in nature. Said floor products comprising a renewable or recyclable content classify the product under the LEED system for commercial products.

In an analogous way, U.S. Pat. No. 8,592,501 discloses a composition which comprises at least a polyalkene, at least a thermoplastic bio-resin obtained from starch or soy or both, and at least a compatibilizer having at least a polyalkene and at least a polar group. Coatings and floor coverings, such as laminate floor coverings, are also described with the composition.

The production of suitable dryblends for processing into laminate panels is often still an energy-intensive process, wherein mixtures are transported, heated and cooled. Such process steps require further optimization in view of a lower material and energy consumption in order to reach an ecological product for floor or wall coverings.

The prior art does not or does not adequately provide a solution to one or more of the afore-mentioned problems.

SUMMARY

To this aim, the invention provides in a first aspect a process for the production of a panel for floor or wall coverings comprising the steps of (i) mixing and homogenising raw materials, thereby obtaining a dryblend, (ii) extruding said dryblend, thereby obtaining one or more thermoplastic layers, and (iii) laminating the afore-mentioned thermoplastic layers, thereby obtaining a panel for floor or wall coverings, wherein said raw materials and/or said dryblend are predominantly transported vertically downwards during the weighing, mixing and/or homogenising of said raw materials and during the feeding of said dryblend to extruders via feeding units.

This offers the advantage that said panels can be produced in an energy-efficient manner. As the transport of raw materials and dryblends can at least partially occur under influence of gravity, there is no additional need for propulsion.

In a second aspect, the present invention provides a panel for floor or wall coverings obtained by a process according to the first aspect of the invention.

In a third aspect, the present invention provides a use of a process according to the first aspect of the invention for manufacturing panels for floor or wall coverings.

DETAILED DESCRIPTION OF THE FIGURES

The explicit characteristics, advantages and objectives of the present invention will further become clear to the skilled person in the technical field of the invention after reading the following detailed description of the embodiment of the invention and of the figures enclosed herein. The figures serve the purpose to further illustrate the invention, without thereby limiting the scope of the invention.

FIGS. 1 to 5 represent, respectively, a simplified representation of a process according to the first aspect of the present invention and a panel according to the second aspect of the present invention.

DETAILED DESCRIPTION OF THE INVENTION

Unless defined otherwise, all terms used in the description of the invention, including technical and scientific terms, have the meaning as is commonly understood by the skilled person in the technical field of the invention. For a better assessment of the description of the invention, the following terms are explained explicitly.

"A", "an" and "the" refer in this document to both the singular and the plural, unless the context clearly implies otherwise. For example, "a segment" means one or more than one segment.

When "around" or "about" is used in this document with a measurable quantity, a parameter, a time period or moment in time, and the like, then variations are meant of +/−20% or less, preferably +/−10% or less, more preferably +/−5% or less, even more preferably +/−1% or less, and even more preferably +/−0.1% or less than and of the cited value, to the extent that such variations apply in the described invention. It should, however, be understood that the value of the quantity in which the term "around" or "about" is used, is itself specifically disclosed.

The terms "comprise", "comprising", "consist of", "consisting of", "provided with", "include" "including", "contain", "containing", "encompass", "encompassing" are synonyms and are inclusive or open terms that indicate the presence of what follows, and which do not exclude or prevent the presence of other components, features, elements, members, steps, known from or described in the prior art.

Quoting numerical intervals by endpoints comprises all integers, fractions and/or real numbers between the endpoints, these endpoints included.

The term "dryblend" is to be understood as a mixture of raw materials, wherein said raw materials are selected from the group comprising thermoplastic, plasticizers, fillers and additives, and wherein said mixture essentially comprises no water. Preferably, said mixture comprises less than 10000 ppm of water and more preferably less than 5000 ppm of water. Most preferably, said mixture comprises between 2500 ppm and 3000 ppm. It goes without saying that lower water contents are desirable, yet since the drying process is generally energy intensive, it is acceptable to operate with the afore-mentioned water contents without thereby negatively affecting the quality of the obtained panels.

The term "weighing unit" is to be understood as a balance having a dosing device which is suitable for weighing and dosing raw materials in desired, pre-determined ratios to a mixing unit. Preferably, said raw materials are fed from one or more silos and/or packaging units, and dosed quantities are supplied to a mixing unit.

The term "mixing unit" is to be understood as a mixer or industrial mixer which is suitable for mixing and homogenising dry raw materials. Preferably, said mixing unit is provided at the top with a feed conduit for the supply of said raw materials from said weighing unit and at the bottom, provided with a discharge conduit for the discharge of a dryblend from said mixing unit to a feeding unit for a buffer unit.

The term "buffer unit" is to be understood as a synonym for the term "buffer tank" and indicates a tank or reservoir which is suitable for at least temporarily comprising said dryblend. Preferably, said buffer unit is provided at the top with a feed conduit for the supply of said dryblend from said mixing unit and at the bottom, provided with a discharge conduit for the discharge of said dryblend from said buffer unit to a feeding unit for an extruder.

The term "feeding unit" is to be understood as a synonym for the terms "feeder" and "supply unit" and relates to a unit which is suitable for feeding a pre-determined quantity of dryblend to an extruder or extruding unit.

The term "extruding" is to be understood as the heating and simultaneously pressing under pressure of a dryblend through a die.

In a first aspect, the invention provides a process for the production of panels for floor or wall coverings comprising the steps of (i) mixing and homogenising raw materials, thereby obtaining a dryblend, (ii) extruding said dryblend, thereby obtaining one or more thermoplastic layers, (iii) laminating the afore-mentioned thermoplastic layers, thereby obtaining a panel for floor or wall coverings, wherein said raw materials and/or said dryblend are predominantly transported vertically downwards during the weighing, mixing and/or homogenising of said raw materials and during the feeding of said dryblend to extruders via feeding units.

The afore-mentioned method offers several advantages. For example, it appears, inter alia, that said panels can be produced in a more energy-efficient manner. One of the reasons for this is that no additional propulsion is required for the transport of raw materials and dryblend because of the influence of gravity. An important additional advantage is the avoidance of a granulation or compounding step, wherein the risks of thermal degradation of a thermoplastic and/or plasticizers and/or additives occurs. Furthermore, such granulation step is a very energy-intensive step, not only because of the additional heating and cooling cycle, but also because of the additional drying step. Avoiding such granulation step provides, in other words, an important energetic, and thus ecological advantage.

Figure 1:
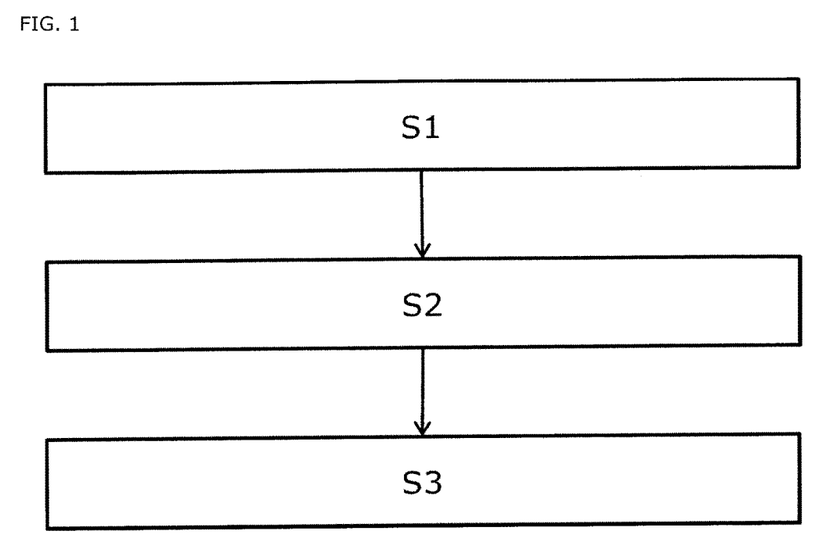
FIG. 1 is a schematic representation of a process according to the first aspect of the invention for the production of panels for floor or wall coverings comprising the steps of (S1) mixing and homogenising raw materials, thereby obtaining a dryblend, ((S2) extruding said dryblend, thereby obtaining one or more thermoplastic layers, and (S3) laminating the afore-mentioned thermoplastic layers, thereby obtaining a panels for floor or wall coverings.
Figure 2:
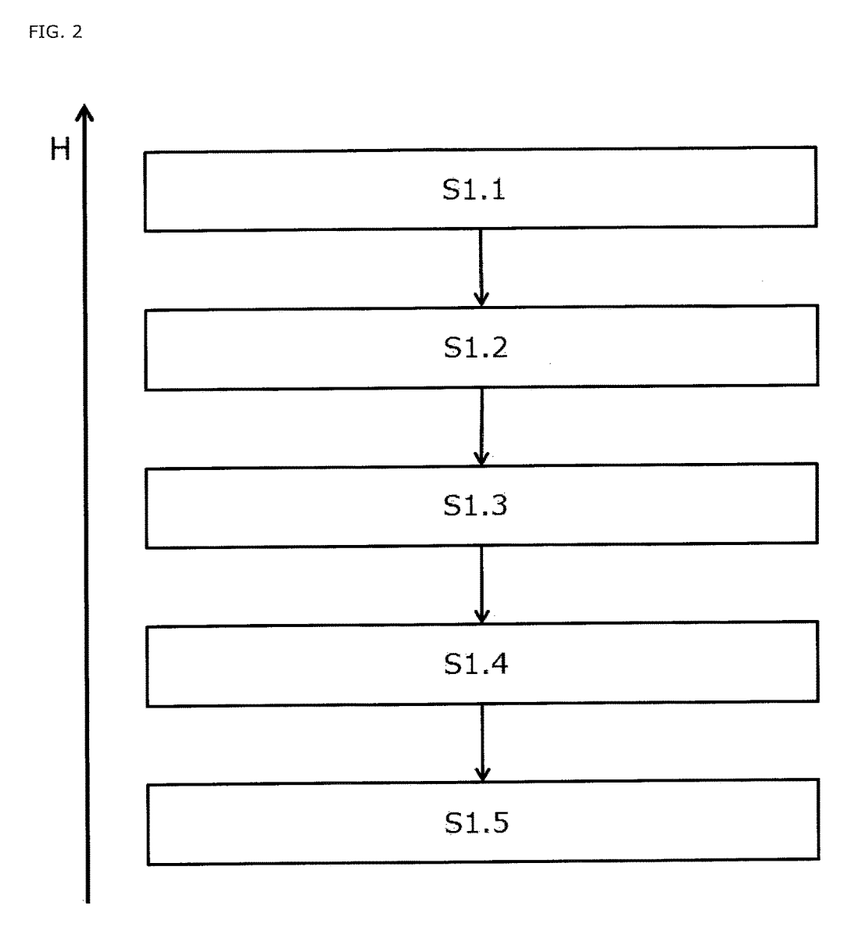
FIG. 2 is a schematic representation of a process according to the first aspect of the invention, with indication of the relative height difference (H) of the weighing unit (S1.1), the mixing unit (S1.2), the buffer tank (S1.3), the feeding unit (S1.4) and the extruder (S1.5).

Preferably, after the lamination of said thermoplastic layers, the laminate obtained thereby is profiled in a subsequent step, so that a panel for floor or wall coverings is obtained. FIG. 1 is a schematic representation of a process according to the first aspect of the invention for the production of panels for floor or wall coverings comprising the steps of (S1) mixing and homogenising raw materials, thereby obtaining a dryblend, (S2) extruding said dryblend, thereby obtaining one or more thermoplastic layers, and (S3) laminating the afore-mentioned thermoplastic layers, thereby obtaining a panel for floor or wall coverings. FIG. 2 is a schematic representation of a process according to the first aspect of the invention, with indication of the relative height difference (H) of the weighing unit (S1.1), the mixing unit (S1.2), the buffer tank (S1.3), the feeding unit (S1.4) and the extruder (S1.5).

In a more preferred embodiment, said raw materials and/or said dryblend are transported between the various processing units for weighing, mixing, buffering, feeding and/or extruding, wherein said processing units, respectively, are situated at separate levels. Preferably, a weighing unit is thus provided above a mixing unit, said mixing unit above a buffer unit, said buffer unit above a supply or feeding unit, and said supply or feeding unit above one or more extruders. In an optional embodiment one can choose not to provide a buffer unit and to conduct said dryblend from said mixing unit to said feeding unit.

In a preferred embodiment, the present invention provides a process according to the first aspect of the invention, wherein said dryblend is obtained by (i) weighing raw materials on a weighing unit at a specific height above one or more mixers, buffer units, feeding units, and/or extruders; and (ii) mixing and homogenising said raw materials with the aid of one or more mixers and/or kneaders.

In a preferred embodiment, the present invention provides a process according to the first aspect of the invention, wherein said raw materials are selected from the group comprising thermoplastics, plasticizers, fillers and additives.

In a more preferred embodiment, said thermoplastics comprise polyvinyl chloride, preferably semi-rigid or possibly soft polyvinyl chloride, that is PVC with plasticizers, for example, with a proportion of plasticizers in the PVC of less than 15% by weight relative to the total weight of said thermoplastic layer, and more preferably less than 10% by weight. In a first embodiment, said PVC layer is intended in a panel with high rigidity and said plasticizers are comprised between 0 and 5% by weight and preferably between 0 and 3% by weight. In a second embodiment, said PVC layer is intended in a panel with high flexibility and said plasticizers are comprised between 5 and 12% by weight, and preferably between 8 and 10% by weight. It is clear that instead of PVC, polypropylene (PP), polyethylene (PE), polyester (PET), polyurethane (PUR) and/or polyamide (PA) can also be used. In a more preferred embodiment, said fillers comprise chalk and/or limestone. Still preferably, said additives comprise foaming agents, such as, for example, physical and/or chemical foaming agents, in an amount of 0.1 to 5.0% by weight, and preferably in an amount of 0.5 to 2.0% by weight, and most preferably 1.0 to 1.5% by weight. Still preferably, said foaming agent has a gas formation capacity higher than 150 mL of gas per gram, and preferably higher than 180 mL of gas per gram, and most preferably of about 200 mL of gas per gram. Higher capacities are desirable, yet according to the prior art, less common.

In a preferred embodiment, the present invention provides a process according to the first aspect of the invention, wherein said dryblend is homogenised by means of one or more hot mixers and/or kneaders. Such installations are intended to obtain a homogenous mixture of a dryblend, without thereby stimulating the cooling of the dryblend. The temperature increase is usually or primarily the result of friction of the dryblend. The temperature of the dryblend can be monitored during homogenisation and can be controlled within a preselected temperature range, for example, higher than a temperature of 70° C. and lower than a temperature of 110° C.

In a more preferred embodiment, the present invention provides a process according to the first aspect of the invention, wherein said dryblend is homogenised at a temperature lower than 105° C., and preferably lower than 100° C. In an even more preferred embodiment, said dryblend is homogenised at a temperature between 85° C. and 100° C., even more preferably between 90° C. and 98° C., and most preferably at a temperature of 91° C., 92° C., 93° C., 94° C., 95° C., 96° C., 97° C. or 98° C., or any temperature therein between. This offers the advantage that in comparison with methods according to the prior art, a lower temperature can be used for the homogenisation, which offers an energetic advantage for the whole process for the production of dryblends.

In a more preferred embodiment, the present invention provides a process according to the first aspect of the invention, wherein said dryblend, after homogenisation, is not cooled to a temperature lower than 40° C. In an even more preferred embodiment, the homogenised dryblend is not cooled to a temperature lower than 60° C., and even more preferably not lower than 70° C. Such cooling of said dryblend, after homogenisation in a hot-cold mixer, or in a kneader with cooling system, is invariably carried out according to the prior art, wherein a cooling to a temperature of about 25° C. to 30° C. is common. By avoiding such cooling, a very energy-intensive step is avoided. Furthermore, the temperature difference to be overcome for the heating of the dryblend is partially avoided prior to feeding it to an extruder. The latter also offers a significant energetic advantage.

In a preferred embodiment, the present invention provides a process according to the first aspect of the invention, wherein said dryblend, after homogenisation, is stored in an insulated buffer tank. Such storage allows to regulate the flow rates of supply of dryblend to the extruders depending on the production needs, and in such a way that the dryblend is fed to an extruder at a substantially constant temperature.

In addition, the insulating of said buffer tank offers an additional energetic advantage since the energy losses to the environment are avoided accordingly. The aim is thereby that energy losses to the environment are limited to a temperature drop of less than 15° C. per hour and preferably less than 10° C. per hour. Most preferably, said energy losses will be limited to less than 5° C. per hour.

In a preferred embodiment, the present invention provides a process according to the first aspect of the invention, at least a thermoplastic layer is formed by means of extrusion and that said thermoplastic layer is laminated with at least a functional layer, wherein said functional layer preferably comprises a multifunctional layer comprising a wear layer, a print layer, a decor layer and a thermoplastic layer.

In a preferred embodiment, the present invention provides a process according to the first aspect of the invention, wherein one or more thermoplastic layers are provided with a reinforcement layer, for example by means of coating of said thermoplastic layer onto a reinforcement layer.

In a more preferred embodiment, said thermoplastic layers comprise one or more reinforcement layers. Said reinforcement layers are intended to improve the stiffness, and then mainly the flexural stiffness of said panels. Preferably, at least one reinforcement layer is situated predominantly in the lower half of the panel obtained by the invention and at least one reinforcement layer is situated predominantly in the upper half of said panel. This offers the advantage that the tendency to bend or curve is suppressed as much as possible. Such a tendency can especially arise or occur in temperature fluctuations and then especially at elevated temperatures.

In a preferred embodiment, said reinforcement layers comprise glass fibres. In a more preferred embodiment, said glass fibres are comprised in a glass fibre fleece and/or in a glass fibre cloth. Preferably, said glass fibres are comprised in a glass fibre fleece, such as, for example a nonwoven. Such nonwoven glass fibres appear to have a better embedding in the thermoplastic matrix, thereby obtaining a stronger and more rigid layer.

In a more preferred embodiment, said glass fibre is pre-treated with an adhesion additive which is intended to improve the adhesion between said glass fibres and said thermoplastic matrix. For example, said glass fibres are impregnated beforehand with the aid of a thermoplastic material, such as, for example, extruded granulate.

In a preferred embodiment, at least said substrate layer and/or at least said top layer comprise additionally individual reinforcing fibres, wherein said individual reinforcing fibres are not laterally interconnected in a network, but are dispersed loosely in a plastic matrix. Preferably, said reinforcing fibres have a length of at least 0.8 mm, and more preferably at least 1.0 mm. Such reinforcing fibres and/or reinforcement layers are intended to contribute to the dimensional stability of the panels obtained according to the method of the invention, which stability is especially desirable against expansion and contraction.

Preferably, said reinforcing fibres are spread out in said one or more thermoplastic layers, whether or not in the form of a glass fibre cloth and/or a glass fibre fleece.

In a more preferred embodiment, said individual reinforcing fibres have an average length of at least 3.0 mm, and preferably an average length of at least 4.5 mm. Preferably, said length is at most 20.0 mm, more preferably at most 12.0 mm, and still more preferably at most 9.0 mm. Preferably, said reinforcing fibres are comprised in said thermoplastic layers in a quantity of between 1 and 25% by weight, and more preferably between 5 and 15% by weight, relative with respect to the total weight of said reinforcing fibres and thermoplastic layers. Still preferably, said fibres correspond to the description according to the DIN 1259 standard. In a first embodiment, said reinforcing fibres comprise glass fibres, however, in an alternative embodiment, steel fibres, carbon fibres, aramid fibres, polyethylene fibres and/or polypropylene fibres may also be used. In yet an alternative embodiment, fibres from biological origin are used, such as for example, but not limited to, flax fibre, bamboo fibre, wood fibre, rice fibre. Said reinforcing fibres preferably have an average diameter ranging between 1 µm and 100 µm, yet more preferably ranging between 3 µm and 30 µm. Most preferably, said average diameter ranges between 5 µm and 25 µm. In a further preferred embodiment, said reinforcing fibres are pre-treated with an additive or coating for improving the adhesion between said reinforcing fibres and said thermoplastic layers, for example, but not limited to, silane. In a further preferred embodiment, reinforcing fibres are selected having a thermal expansion coefficient smaller than the thermal expansion coefficient of said thermoplastic layers in which said fibres are incorporated and/or with a Young's modulus which is preferably greater than the modulus of said thermoplastic layers, and preferably greater than 40 GPa, and more preferably greater than 60 GPa. In an additional preferred embodiment, said invention provides a panel with reinforcing fibres having a thermal expansion coefficient of less than 30 µm/m·K, and more preferably less than 5 µm/m·K. In a preferred embodiment, said glass fibres have a length of 1 mm or more, and preferably a length of 3 mm or more. In a preferred embodiment, said glass fibres have a diameter situated between 5 and 25 µm.

In a more preferred embodiment, the present invention provides a process according to the first aspect of the invention, wherein said reinforcement layer is impregnated with a thermoplastic.

In a preferred embodiment, the present invention provides a process according to the first aspect of the invention, wherein recycled material is mixed and homogenised with the afore-mentioned dryblend. The term "recycled material" is indicated to both extrusion waste produced during the production process and plastic waste such as, for example, but not limited to, residues of window profiles. This offers, on the one hand, the advantage that less waste is produced and on the other hand, that raw materials are utilised to the maximum.

In a second aspect, the present invention provides a panel for floor or wall coverings obtained by a process according to the first aspect of the invention.

In a preferred embodiment, the present invention provides a panel according to the second aspect of the invention, comprising a back-pull layer, a substrate layer, a decor layer or print layer, a wear layer and optionally a coating layer.

In a more preferred embodiment, said panel according to the invention comprises essentially a top layer and a substrate layer, wherein said layers enclose a reinforcement layer. Preferably, said panel is comprised out of the afore-mentioned layers for more than 75% by weight, and more preferably for more than 90% by weight.

In a preferred embodiment, said substrate layer has a thickness comprised between 0.5 mm and 8.0 mm, and more preferably between 1.0 mm and 4.5 mm. Even more preferably, said panel is comprised out of said substrate layer for at least 50% by weight, and more preferably for at least 60% by weight.

In a preferred embodiment, the present invention provides a panel according to the second aspect of the invention, wherein said substrate layer comprises a PVC foam. In a more preferred embodiment, said substrate layer comprises a closed cell and/or partly open cell PVC foam having a density of between 200 kg/m$^3$ and 2500 kg/m$^3$, and more preferably between 600 kg/m$^3$ and 2000 kg/m$^3$. Most preferably, said density is comprised between 800 kg/m$^3$ and 1600 kg/m$^3$. Such panels provide a good rigidity, stiffness and dimensional stability, as well as a good water-resistance, and improved acoustic and/or thermal insulating properties. Preferably, the afore-mentioned relates to foamed PVC sheet, or a foamed plastic sheet which consists essentially of another vinyl compound, such as polyvinyl dichloride, polyvinyl butyrate, polyvinyl acetate and the like. As an alternative, melamine foam, polyurethane or polyisocyanurate can also be used as the basic material for the substrate. As mentioned above as well, an average density of the plastic sheet of about 1200 kilograms per cubic meter leads to an optimal result of all the beneficial and adverse effects. For example, a lower density provides a lower material consumption and a lower weight, which is advantageous during transport and installation; however, exhibiting a lower stiffness, a less desirable acoustic, insulating properties and a high residual indentation. Such density can be achieved by means of plastic materials of the closed cell type, this in contrast to the common hard foams of the open-cell type, for example, polyester hard foams.

In an optional embodiment, said panel according to the invention is further provided with a balance layer or back-pull layer, which is intended as a counter weight or balance for said top layer. Such balance layer typically comprises a thermoplastic plastic layer, and typically has a thickness and weight of approximately equal to said top layer, yet preferably is slightly thinner and lighter. However, preferably such balance layer is not present in the preferred embodiment of the panel according to the invention. Thus, afore-mentioned substrate layer in such an embodiment also forms the bottom layer of said panel without further protective layer.

In a more preferred embodiment, said panel according to the invention comprises a top layer with a printed decor, and a protective layer or wear layer provided above that. Said printed decor or decor layer with print layer may consist of a printed plastic film with a thickness ranging between 0.1 mm and 1.0 mm and may be made of PVC film, PU film, PP film, or PET film, but is preferably made of PVC film. Preferably, said PVC film is a hard PVC film with a low content of plasticizers, by this, it is meant that the plasticizer content in said PVC is lower than 15% by weight, and preferably lower than 5% by weight. Most preferably, said PVC film does not comprise plasticizers. Even more preferably, a PVC film is used with a K-value comprised between 50 and 80, and more preferably, a K-value between 60 and 75. This offers the advantage of a hard PVC layer which can be printed very accurately. In addition, the drying process after the printing with water-based inks is very simply by means of the necessary heat supply to said decor layer. In an optional embodiment, said top layer may additionally comprise a UV surface coating, for example, to improve the gloss, but also the resistance to staining.

In a preferred embodiment, the present invention provides a panel according to the second aspect of the invention, wherein at least one of the said thermoplastic layers comprise polyvinyl chloride (PVC).

Preferably, said wear layer is a translucent or transparent layer through which the aspect of the underlying decor is visible. Such transparent layer can be easily obtained by means of extrusion, coating and/or calendering of a thermoplastic material. A suitable material choice can be made by selection from a group comprising PVC, PU, PP or PET, but preferably PVC. Even more preferably, a PVC is used for said wear layer with a K-value comprised between 60 and 95 and more preferably a K-value between 70 and 85. Optionally, additives can be added for enhancing the wear resistance, yet this does not appear to be necessary for a proper execution in order to maintain a sufficient wear resistance. A sufficient wear resistance can be understood as a panel from class AC2 or AC3, measured according to EN 660 and/or EN 13329. Preferably, said wear layer has a thickness of at least 0.10 mm and more preferably at least 0.25 mm. Preferably, said thickness is less than 1.0 mm and more preferably less than 0.50 mm. Most preferably, said wear layer has a thickness comprised between 0.30 mm and 0.40 mm. Such wear layers are found to have a sufficient wear resistance, and succeed in Taber tests with an IP value of 2000 or more, measured according to EN 13329. In a most preferred embodiment, the present invention provides a panel according to the first aspect of the invention, wherein said transparent wear layer comprises PVC.

Figure 3:
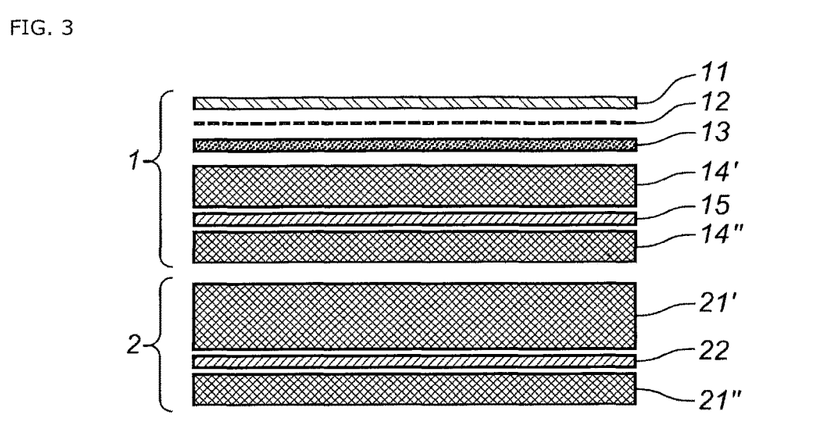
FIG. 3 is a schematic representation of a panel according to the invention with indication of a top layer (1) comprising a wear layer (11), a print layer (12), a decor layer (13), a first thermoplastic layer (14', 14") with a reinforcement layer (15); and a substrate layer (2) comprising a second thermoplastic layer (21', 21") with a reinforcement layer (22).

FIG. 3 is a schematic representation of a panel according to the invention with indication of a top layer (1) comprising a wear layer (11), a print layer (12), a decor layer (13), a first thermoplastic layer (14', 14") with a reinforcement layer (15); and a substrate layer (2) comprising a second thermoplastic layer (21', 21") with a reinforcement layer (22).

In an optional embodiment, said panel according to the invention is further provided with a protective lacquer layer or coating layer. Such lacquer layer may for instance be implemented as a PU layer and/or a curing lacquer layer, such as, for example, but not limited to a UV or an electron beam curing lacquer layer.

In a preferred embodiment of a panel according to the second aspect of the invention, said panel provides at least at two mutually opposite edges, and preferably at four mutually opposite edges, connection means or attachment means for laterally connecting two panels next to one another and substantially in the same plane. Preferably, said connection means relate to mechanical connection means for a locking or fixation of both constituting panels, both in the vertical direction, this is the direction perpendicular to the plane of afore-mentioned constituting panels, and in the horizontal direction, this is the direction in the plane of afore-mentioned constituting panels.

In a preferred embodiment, the present invention provides a panel according to the second aspect of the invention, wherein said panel provides said mechanical connection means in an embodiment comprising a lateral protrusion and recess, respectively, wherein said protrusion and recess essentially correspond with one another with regard to form, yet in the connected state, is provided with possible open spaces in the longitudinal direction of said edges, wherein said open spaces are intended to build up a well-defined flexural tension in said lateral protrusion during the connecting in order to thus secondarily fix said constituting panels with respect to one another.

In a preferred embodiment, the present invention provides a panel according to the second aspect of the invention, wherein said panel provides said mechanical connection means, as described in the preceding paragraph, wherein said lateral protrusion is further equipped with a secondary, transverse protrusion and wherein said lateral recess is further equipped with a secondary, transverse recess, in a way that both constituting panels, when positioned in the connected state relative to one another, afore-mentioned secondary, transverse protrusion and afore-mentioned secondary, transverse recess overlap and thus ensure a mechanical anchoring of both afore-mentioned constituting panels in the secondary direction, this is the direction in the plane of afore-mentioned panels, yet perpendicular to the longitudinal direction of said edges.

In a preferred embodiment, the present invention provides a panel according to the second aspect of the invention, wherein said mechanical connection means are further provided in an embodiment suitable for the corresponding connection of the constituting connection parts, as is known for example from, but not limited to, WO 94/26999 or EP 1 026 341. Such corresponding connection can, for example, be built up by the application of a curvature in afore-mentioned lateral protrusion. Preferably, said lateral protrusion is implemented in such way that both constituting connection parts are composed by sliding said constituting panels towards one another in the horizontal direction, this is the direction in the plane of afore-mentioned constituting panels.

In a preferred embodiment, the present invention provides a panel according to the second aspect of the invention, wherein said connection means were obtained by means of a milling operation at the edges of afore-mentioned constituting panels.

Figure 4:
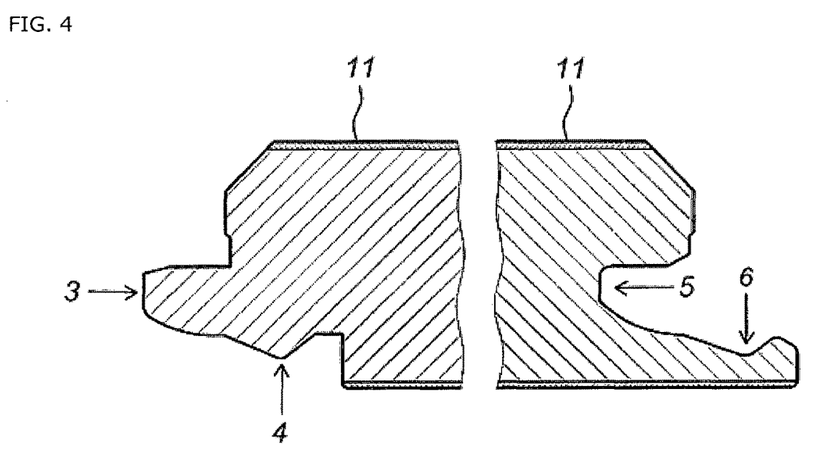
FIG. 4 is a schematic representation of the cross-section of a panel according to the invention with indication of connection means which are provided along the edges of said panel.
Figure 5:
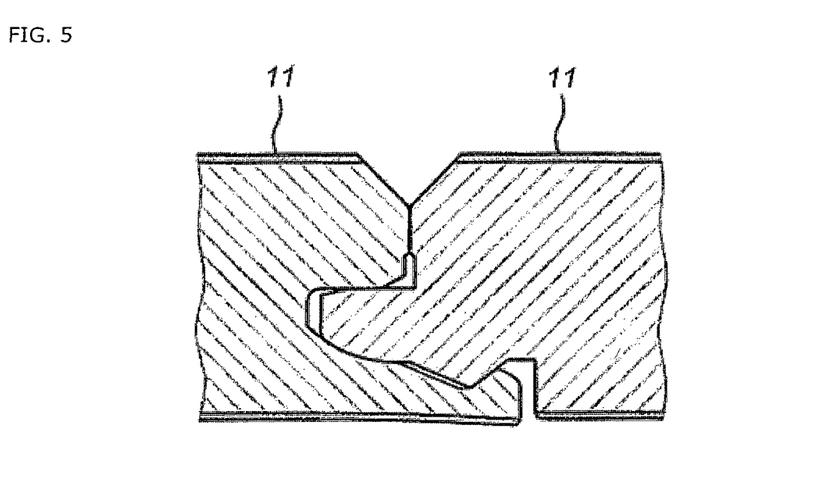
FIG. 5 is a schematic detail representation of connection means of panels connected laterally in connected state.

FIG. 4 is a schematic representation of the cross-section of a panel according to the invention with indication of connection means which are provided along the edges of said panel. In FIG. 4, the lateral protrusion (3) was also equipped with a secondary, transverse protrusion (4). In an analogous manner, the lateral recess (5) is further equipped with a secondary, transverse recess (6). FIG. 5 is a schematic detail representation of connection means of panels connected laterally in the connected state.

In a preferred embodiment, the present invention provides a panel according to the second aspect of the invention, wherein said connection means are substantially comprised in the afore-mentioned substrate layer, wherein said substrate layer preferably comprises afore-mentioned at least one reinforcement layer. More preferably, the afore-mentioned connection means are provided in said panel in such way, so that afore-mentioned at least one reinforcement layer is comprised in afore-mentioned lateral protrusion, to thus provide sufficient strength to said connection means. Even more preferably, the afore-mentioned panel according to the invention is provided in a form wherein at least two pairs of corresponding opposite edges are provided, wherein said edges are provided with the afore-mentioned connection means.

In a preferred embodiment, the present invention provides a panel according to the second aspect of the invention, wherein said connection means have a thickness of at least 2.0 mm, and preferably at least 2.5 mm. More preferably, said connection means have a thickness of at least 3.0 mm, and still more preferably, said connection means have a maximum thickness of 6.0 mm and most preferably maximally 5.0 mm. Such thickness of the afore-mentioned connection means, optionally and preferably carried out additionally with the afore-mentioned reinforcement layer, usually provides a sufficiently qualitative bond between the constituting parts and, moreover, is generally sufficiently strong to withstand possible damage during transportation or construction of the mentioned floor or wall coverings.

Although the invention according to a preferred embodiment provides connection means along the edges of afore-mentioned panels, the skilled person in the technical field of floor and/or wall coverings will appreciate the fact that said panels can be implemented in the absence of said connection means. In such an embodiment, said panels are intended to be fixed on a subsurface, for example by means of gluing.

The binder or the bonding ensures a further stabilisation of the dimensions of the panels. As an alternative to the afore-mentioned bonding, a fixative can also be used. Such fixative or fixing agent signifies an adhesive which is suitable to bind panels to a subsurface, yet can be removed in a simple manner and without causing damage to the subsurface. By stabilisation by one or more reinforcement layers, an effective gluing appears to be unnecessary. In such cases, said panels are carried out with a total thickness of afore-mentioned substrate layer and afore-mentioned top layer situated between 1.0 mm and 5.0 mm and preferably situated between 1.5 mm and 4.0 mm. Most preferably, the afore-mentioned thickness is situated between 2.0 mm and 3.0 mm. In an analogous, yet separate embodiment, a panel according to the first aspect of the invention is provided with a thickness comprised between 4.0 mm and 10.0 mm, and more preferably between 6.0 mm and 8.0 mm. Such panels are usually used as so-called loose panels, or referred to by the English term as "loose-lays", by which is meant that no additional adhesive or fixative is used to fix the panels onto a subsurface. Nevertheless, one can opt to still apply such an adhesive.

In a more preferred embodiment, the afore-mentioned panels according to the second aspect of the invention are designed in a rectangular shape for providing panels or in an approximately square shape for providing tiles. In a first embodiment, said panels are designed in a rectangular shape with a length ranging between 0.5 m and 3.0 m, preferably between 0.9 m and 2.5 m, and more preferably between 0.9 m and 1.8 m; and with a width ranging between 5 cm and 25 cm, preferably between 7 cm and 25 cm, and most preferably between 15 cm and 25 cm. In an alternative embodiment, said tiles are designed in rectangular to approximately square shape with a side ranging between 10 cm and 100 cm, preferably between 15 cm and 75 cm, and more preferably between 20 cm and 60 cm. In a preferred embodiment, the present invention provides a panel according to the second aspect of the invention, wherein said back-pull layer and/or core layer are at least partially made of polyvinyl chloride.

In a third aspect, the present invention provides a use of a process according to the first aspect of the invention, for manufacturing panels for floor or wall coverings.

The most preferred embodiment of a process and panel according to the invention is obtained by the suitable combination of multiple of the afore-mentioned aspects, which can be identified by a person skilled in the technical field of vinyl laminate panels for floor or wall coverings.

The invention claimed is:

1. Process for the production of panels for floor or wall coverings comprising the steps of (i) mixing and homogenising raw materials, thereby obtaining a dryblend, (ii) extruding said dryblend, thereby obtaining one or more thermoplastic layers, (iii) laminating the afore-mentioned thermoplastic layers, thereby obtaining a panel for floor or wall coverings, whereby said raw materials and/or said dryblend are predominantly transported vertically downwards during the weighing, mixing and/or homogenising of said raw materials and during the feeding of said dryblend to extruders via feeding units, wherein said dryblend after homogenisation, is stored in an insulated buffer tank.

2. Process according to claim 1, wherein said dryblend is obtained by (i) weighing raw materials on a weighing unit at a desired height above one or more mixers, buffer units, feeding units, and/or extruders; and (ii) mixing and homogenising said raw materials with the aid of one or more mixers and/or kneaders.

3. Process according to claim 1, wherein said raw materials are selected from the group consisting of thermoplastics, plasticizers, fillers, and additives.

4. Process according to claim 1, wherein said dryblend is homogenised with the aid of one or more hot mixers and/or kneaders.

5. Process according to claim 4, wherein said dryblend is homogenised at a temperature lower than 105° C.

6. Process according to claim 5, wherein said dryblend after homogenisation is not cooled to a temperature lower than 40° C.

7. Process according to claim 1, wherein at least one thermoplastic layer is formed by means of extrusion, and in that said thermoplastic layer is laminated with at least a functional layer, wherein said functional layer preferably comprises a multi-functional layer comprising a wear layer, a print layer, a decor layer and a thermoplastic layer.

8. Process according to claim 1, wherein one or more thermoplastic layers are provided with a reinforcement layer.

9. Process according to claim 8, wherein said reinforcement layer is impregnated with a thermoplastic.

10. Process according to claim 1, wherein recycled material is mixed and homogenised with the afore-mentioned dryblend.

11. Process according to claim 5, wherein said dryblend is homogenised at a temperature lower than 100° C.

12. Process according to claim 8, wherein the reinforcement layer is a coating.

13. Process according to claim 1, wherein the insulated buffer tank limits a temperature drop to less than 15° C. per hour.

* * * * *